United States Patent [19]

Schoen et al.

[11] 4,022,745

[45] May 10, 1977

[54] PROCESS FOR THE PREPARATION OF A GLUE BASED ON A THERMOPLASTIC ELASTOMERIC BLOCK-COPOLYMER

[75] Inventors: Lowhardt A. A. Schoen, Geleen; Franciscus A. Busschers, Spaubeek, both of Netherlands

[73] Assignee: Stamicarbon B.V., Geleen, Netherlands

[22] Filed: Jan. 21, 1975

[21] Appl. No.: 542,867

[30] Foreign Application Priority Data

Jan. 25, 1974 Netherlands ............... 7401014

[52] U.S. Cl. .................... 260/30.2; 156/331; 260/30.4 A; 260/33.2 R; 260/33.6 UB; 260/33.6 UA; 260/33.8 UB; 260/33.8 UA; 260/859 R
[51] Int. Cl.$^2$ ........................ C08K 5/06
[58] Field of Search ... 260/30.2, 33.6 UB, 33.6 UA, 260/33.2, 859 R, 880 B, 33.8 UB, 33.8 UA, 30.4 A

[56] References Cited

UNITED STATES PATENTS

| 3,562,355 | 2/1971 | Holden ..................... 260/859 R |
| 3,598,795 | 8/1971 | van der Berg et al. ........ 260/880 B |
| 3,719,621 | 3/1973 | Vogt et al. ................ 260/33.6 UB |

*Primary Examiner*—J. Ziegler
*Attorney, Agent, or Firm*—Cushman, Darby & Cushman

[57] ABSTRACT

An adhesive composition comprising (1) a liquid inert organic vehicle, (2) a thermoplastic elastomeric block copolymer of the type $AB(A)_n$, wherein A represents terminal non-elastomeric polymer blocks; B an elastomeric polymer block, which may be branched; and $n$ a number between 1 and 10; and (3) a polymer containing 2 to 5 reactive isocyanate groups per molecule and having a polymer chain with a molecular weight of between 500 and 10,000.

12 Claims, No Drawings

PROCESS FOR THE PREPARATION OF A GLUE BASED ON A THERMOPLASTIC ELASTOMERIC BLOCK-COPOLYMER

The invention relates to an adhesive based on a thermoplastic elastomeric block-copolymer, and to the preparation and to use of the adhesive, for substrates consisting of rubbers.

It is known that the thermoplastic elastomeric block-polymers of the type $AB(A)_n$, where A represents a non-elastomeric polymer block, B an elastomeric polymer block, and $n$ a whole number between 1 and 10, may be used in glue compositions. Adhesive compositions containing such a thermoplastic elastomeric block-copolymer, a resinous tackifier and a liquid tackifier or an antioxidant and an elastomeric polymer as essential components are disclosed in South African Pat. Specifications No. 7203895 and 7107058.

Solutions of thermoplastic elastomeric block-copolymers in inert solvents, in the absence of other additives, are not very suitable as adhesives or glues, partly because the adhesive layers formed by using such glues have low resistance to higher temperatures and to aging.

SUMMARY OF THE INVENTION

According to the invention, an adhesive based on a thermoplastic elastomeric block-copolymer comprises a mixture of (1) a liquid inert organic vehicle, (2) a thermoplastic elastomeric block-copolymer of the type $AB(A)_n$, where A represents non-elastomeric terminal polymer blocks, B an elastomeric polymer block which may be branched, and $n$ a number between 1 and 10, and (3) a polymer containing 2 to 5 reactive isocyanate groups per molecule and having a polymer chain with a molecular weight of between 500 and 10,000.

The object of the invention is to provide an adhesive based on a thermoplastic elastomeric block-copolymer of the type $AB(A)_n$ with improved properties. A particular object of the invention is to prepare an adhesive of this type which is suitable for gluing substrates made of saturated or slightly unsaturated rubbers, such as EPDM rubbers.

EPDM rubber substrates are particularly difficult to glue. Commercially available adhesives result in poor adhesion of EPDM substrates. Furthermore, the adhesive layer does not resist higher temperatures and deteriorates. The term "EPDM rubbers" denotes copolymers of ethylene with at least one other alpha-alkene, and, optionally, one or more polyenes. EPDM substrates may be glued in the vulcanized as well as in the unvulcanized state. EPDM rubbers usually contain 20–75% by weight of ethylene, 25 to 80% by weight of an alpha-alkene containing at least three carbon atoms, and 0–10% by weight of one or more polyenes.

The invention will be more fully elucidated in the detailed description set forth below.

DETAILED DESCRIPTION OF THE INVENTION

According to the invention, an adhesive based on a thermoplastic elastomeric block-copolymer consists of a mixture of (1) a liquid inert organic vehicle, (2) a thermoplastic elastomeric block-copolymer of the type $AB(A)_n$, where A represents non-elastomeric terminal polymer blocks, B an elastomeric polymer block which may be branched, and $n$ a number between 1 and 10, and (3) a polymer containing 2 to 5 reactive isocyanate groups per molecule and having a polymer chain with a molecular weight of between 500 and 10,000.

The object of the invention is to provide an adhesive based on a thermoplastic elastomeric block-copolymer of the type $AB(A)_n$ with improved properties. A particular object of the invention is to prepare an adhesive of this type which is suitable for gluing substrates made of saturated or slightly unsaturated rubbers, such as EPDM rubbers.

EPDM rubber substrates are particularly difficult to glue. Commercially available adhesives result in poor adhesion of EPDM substrates. Furthermore, the adhesive layer does not resist higher temperatures and deteriorates. The term "EPDM rubbers" denotes copolymers of ethylene with at least one other alpha-alkene, and, optionally, one or more polyenes. EPDM substrates may be glued in the vulcanized as well as in the unvulcanized state. The EPDM rubbers usually contain 20–75% by weight of ethylene, 25 to 80% by weight of an alpha-alkene containing at least three carbon atoms, and 0–10% by weight of one or more polyenes. Examples are the copolymers based on ethylene propylene and one or more non-conjugated dienes, such as 1,4-hexadiene, dicyclopentadiene, 5-vinyl norbornene, 5-ethylidene norbornene, or 1,5-cyclooctadiene. The EPDM rubbers may contain the usual fillers and additives, such as carbon black, oil, pigments, stabilizers, lubricants, antioxidants, silica fillers, chalk, etc. The copolymers may be vulcanized in the usual way, e.g. with peroxides and/or sulphur and/or sulphur donors, if so desired in combination with accelerators, ultra-accelerator and/or vulcanization retarders.

The adhesives according to the invention are stable even after storage, very simple to process, and result in better adhesion than, e.g. solutions containing only a thermoelastic block-copolymer in a solvent.

The adhesives according to the invention comprise 5–95% by weight of a thermoplastic elastomeric block-copolymer of the type $AB(A)_n$ and a polymer containing isocyanate groups, calculated to the entire mixture. Preferably, the mixture of both active components is dissolved in an inert organic solvent to form a solution containing 5–60% by weight of the mixture of active ingredients. Most preferably, the solution contains 15 to 35% by weight of the mixture of both active ingredients. Higher concentrations of active ingredients may also be used, but will render the glue very viscous. For instance, a 25% by weight solution has a viscosity of 7–11 poises and 30% by weight solution a viscosity of 15–20 poises.

The polymers containing isocyanate groups may generally be used in amounts of between 2 and 50% by weight based on the weight of the thermoplastic elastomeric block-copolymer, and, preferably, in amounts ranging between 5 and 50% by weight of the thermoplastic elastomeric block-copolymer. The best results are obtained with amounts of 5 to 15% by weight of polymer containing isocyanate groups, based on the weight of thermoplastic elastomeric block-copolymers.

The thermoplastic elastomeric block-copolymer has the formula $AB(A)_n$, where A represents a non-elastomeric block, B an elastomeric polymer block which may be branched, and $n$ a number between 1 and 10. Preferably, $n$ has a value of 1 through 3. A is preferably a terminal polymer block of a mono-alkenyl-aromatic compound, and B is preferably a branched or unbranched polymer block of a conjugated diene.

By mono-alkenyl-aromatic compound is meant an aryl (phenyl) substituted vinyl compound, wherein said aryl may be substituted or unsubstituted and if substituted, the substituents may be lower alkyl of 1 to 4 carbon atoms or halogen (chlorine or bromine) and wherein said vinyl group contains at least two carbon atoms and may be, optionally, substituted in the alpha or beta position by lower alkyl of 1 to 4 carbon atoms or by halogen atoms (chlorine or bromine). The mono-alkenyl-aromatic compound used to form A may be styrene, alpha-methyl styrene, chlorostyrene, and/or other compounds derived from styrene and alpha-methyl styrene by nucleophilic substitution. However, use is preferably made of styrene, and, in particular, of alpha-methyl styrene.

The conjugated diene used to from B contains 4 to 12, preferably 4 to 6 carbon atoms. Some examples of conjugated dienes that may be used are 2-chlorobutadiene; 2,3-dimethyl butadiene; and, especially, butadiene and isoprene.

The block copolymers AB(A)$_n$ used according to the invention are well known in the art. They are usually prepared by means of an anionic initiator, preferably an organolithium compound in relatively apolar solvents. These block copolymers may be prepared by a so-called sequence polymerization process, in which, e.g., a mono-alkenyl-aromatic compound, a conjugated diene, and, finally, again a mono-alkenyl-aromatic compound are added successively to the initiator present in the solvent.

Preferably, however, the block copolymers are prepared by a so-called linking (coupling) process, in which a living two-block copolymer is formed by sequence polymerization in a first stage of preparation and the living two-block copolymers are then combined to form a multi-block copolymer by means of a linking agent (coupler). The linking agent used may be bifunctional as well as tri- or polyfunctional. Depending on the number of functional groups of the linking agent chosen, either a linear three-block or a branched block copolymer in which three, four or more two-blocks have been linked may be formed.

When branched block copolymers are formed, the middle part is an elastomeric block, albeit that this block has a branched structure, and the terminal blocks are formed by nonelastomeric polymer blocks. The linking agents that may be used are well known in the art. Examples of suitable linking agents are monoesters and diesters of carboxylic acids and alcohols, di-isocyanates tri-isocyanates polyisocyanates, dihalogen, trihalogen or polyhalogen compounds, polyepoxides, carbon monoxide, carbon dioxide, carbon disulphide, polyaldehydes, polyanhydrides, carbonyl sulphide, and chlorosilanes. Particularly suitable are silane compounds and isocyanate compounds, such as dialkyl dichlorosilane, mono-alkyl trichlorosilane, and toluene di-isocyanate.

It may be advantageous to use block copolymers the middle block of which consists of a polymer block from a conjugated diene that is fully or partly hydrogenated. Such block copolymers improve the resistance to ageing by the adhesives of the invention. The hydrogenation may be carried out in a known way by means of hydrogen in the presence of a hydrogenation catalyst.

Examples of particularly suitable block copolymers and their methods of preparation are described in detail in the British Patent No. 1,189,767 and U.S. Patent Application No. 503,081, filed Sept. 4, 1974 which are incorporated by reference herein.

The block copolymers may have widely varying molecular weights, but preferably the block copolymers have non-elastomeric blocks of molecular weights of 5000 to 20,000. "Molecular weight" here denotes number-average molecular weight. The molecular weight of the non-elastomeric block is preferably 7500 to 17,000, since block copolymers with these characteristics optimize the advantages of the adhesives of the invention. Thus, EPDM rubber may be bonded to another substrate with a bond strength, expressed as peeling force, of at least 3 kg/2,5 cm and more often exceeding 5 kg/2,5 cm.

The molecular weight of the elastomeric polymer block is less critical than the molecular weight of the non-elastomeric block as regards the properties of the block copolymer. Preferably, the molecular weights of the elastomeric polymer block in a linear block copolymer ranges between 20,000 and 100,000 and most preferably between 30,000 and 75,000. It should be noted that the optimum molecular weights given depend on the structure of the resulting block copolymer. Thus maximum molecular weight of the elastomeric block will often be higher in branched polymers than in linear block copolymers, for instance, between 30,000 and 200,000. The block copolymers usually have terminal non-elastomeric blocks of about the same molecular weight, but block copolymers having non-elastomeric blocks of different molecular weights may also be used.

The second essential component of the glue according to the invention is a polymer containing one to five reactive isocyanate groups per molecule, said polymer having a molecular weight between 500 and 10,000. These polymers may be prepared by reaction of a di-isocyanate with a polymer containing reactive groups. These polymers preferably contain two to three reactive isocyanate groups per molecule. Very suitable polymers are the reaction products of a di-isocyanate and a polymer containing 2 to 5 hydroxyl groups per molecule, preferably 2 to 3 hydroxyl groups per molecule, and having a molecular weight of between 500 and 10,000.

When the polymer containing isocyanate groups is the reaction product of a diisocyanate and the polymer that contains 2 to 3 hydroxyl groups per molecule, the polymer with 2 or 3 hydroxyl groups may be a polyether containing terminal hydroxy groups; a polyester, based on a diol and a dicarboxylic acid having terminal hydroxy groups; polylactones having terminal hydroxy groups, polyacrylates containing hydroxyl groups, telechelic rubber homopolymers containing hydroxyl groups and based on a conjugated aliphatic diene, and telechelic rubbery copolymers containing hydroxyl groups and based on at least one conjugated aliphatic diene in combination with at least one copolymerizable olefinically unsaturated comonomer: in this reaction product, substantially all hydroxyl groups are replaced by a radical containing at least one free isocyanate group, the radical being a reaction product of said hydroxyl groups with said diisocyanate radicals. When reacted with di-isocyanate, or a polyisocyanate, all hydroxyl groups of the polymer containing 2 to 5 hydroxy groups are replaced by a radical containing at least one free isocyanate group. These hydroxyl-terminal polymers may have a molecular weight between 500 and 10,000, but preferably these polymers have a molecular weight of between 1000 and 7000, while best results being obtained with polymers having molecular weights between 1500 and 4000. The number of isocyanate groups per molecule may be 2 to 5, preferably 2 to 3, while the best results are obtained with an average number of isocyanate groups of 2–2.7 per molecule. Examples of polymers containing hydroxyl groups that can form the basis of the polymers containing isocyanate groups are polyethers containing terminal hydroxy groups; polyesters, containing terminal hydroxy groups, based on diols and dicarboxylic acids; polylactones containing terminal hydroxy groups, polyacrylates containing hydroxyl groups, and rubbery polymers and copolymers provided with terminal hydroxyl groups and based on butadiene and/or isoprene and, optionally, mono-olefinically unsaturated comonomers, such as styrene or acrylonitrile. Preferably the latter mentioned rubbery polymers are used, because they impart to the final adhesive layers a better resistance to oil. Examples of polymers containing hydroxyl groups are polyalkylene glycols, such as polyethylene glycol, polypropylene glycol, polytetrahydrofuran, copolymers from ethylene oxide, propylene oxide; polyesters based on butadiol and adipic acid; polycaprolactone, polyvalerolactone; copolymers of betahydroxyethyl acrylate with one or more other monomers such as e.g. butyl acrylate, methyl acrylate, acrylamide, acrylonitrile or styrene. Hydroxyl-containing polymers of all these types are commercially available.

The di-isocyanate used may be any aromatic (aryl) or aliphatic di-isocyanate containing 6 to 20 carbon atoms, such as, e.g., 2-4 or 2-6-toluene di-isocyanate, 4—4′-diphenylmethane di-isocyanate, hexamethylene di-isocyanate, 4—4′-biphenylene di-isocyanate, 4—4′-di-isocyanato-dicyclohexyl methane. Preferably di-isocyanates containing isocyanate groups of different reactivity, e.g., toluene di-isocyanate, are used. The polymers containing hydroxyl hydroxy groups can be made to react with the di-isocyanates simply by heating both in a suitable vehicle, optionally, in the presence of a known catalyst.

The vehicle used may be any of the various conventional liquid vehicles used in glues. If the glue is to be used for gluing EPDM polymers, preferably the vehicle or mixture of vehicles used is capable of thoroughly wetting the EPDM rubber. These vehicles are solvents for the active components of the adhesive of the invention. In general, they are vehicles of low polarity, e.g. aromatic vehicles such as benzene, toluene, xylenes, chlorobenzene, or chlorinated hydrocarbons containing 1 to 4 carbon atoms, such as carbon tetrachloride, dichloromethane, trichloroethane, trichloroethane, or other vehicles such as tetrahydrofuran, or mixtures thereof. It is also possible to use mixtures of the active components of the invention with vehicles that are less suitable for EPDM glue, e.g. a mixture with cyclohexane, methylcyclohexane, or other aliphatic or cyclo-aliphatic vehicles. Good results for adhesives used for EPDM polymers are obtained when the vehicle used is toluene, xylenes, tetrahydrofuran, mixtures of these and mixtures with cyclohexane. When the adhesives or glues of the invention are used for gluing substrates other than EPDM, a wider choice of conventional vehicles is available. In the latter case use may also be made of aliphatic or cycloaliphatic vehicles, such as cyclohexane, pentamethyl heptane, or other known vehicles. Other vehicles that may be used are, e.g., methyl-ethyl ketone, or ethyl acetate, optionally, in combination with other vehicles. The term "vehicles" includes solvents. Use is preferably made of vehicles that act as solvents, especially when the adhesive composition is used for gluing an EPDM substrate and has a concentration of active components of below 60% by weight. Preferably the vehicles used having boiling points below 150° C. By inert organic vehicle is meant a vehicle, or solvent, which is unreactive with the active components of the adhesive of the invention.

The glue according to the invention may be prepared by distributing the components separately in the vehicle chosen and then by combining these separate mixtures. Alternatively, the adhesive composition may be prepared by allowing a diisocyanate to react with a solution of the polymer containing hydroxyl groups, in the presence of a thermoplastic elastomeric block copolymer. Other components are not necessary to obtain proper adhesion by the adhesive composition but may be added, if so desired. Examples of substances that may be added are agents for increasing the viscosity, antioxidants, pigments, compounds that form free radicals when heated, and monomeric polyisocyanates.

The glue according to the invention is very simple to process, the more so because it is of the one-component type. A layer of glue may be applied to the surfaces to be joined, e.g., by smearing, immersion or spraying, after which the surfaces are exposed to the air for a period of time, the "open time", varying from a few seconds to some dozens of minutes, e.g. 5 seconds to 25 minutes, in particular 1 to 10 minutes, and then by contacting the surfaces to be adhered. The initial adhesion is excellent, so that it is not necessary to clamp the smeared surfaces for a long time. In general, the layer of glue has fully hardened after 2 to 3 days at room temperature, of after about 1 hour at 80° C.

The glue according to the invention is suitable for joining substrates of relatively polar material, such as, e.g., metal, wood, leather, polyvinyl chloride, polyurethanes, polyacrylates, polyesters, cotton, paper, etc. The adhesive composition of the invention is very suitable for gluing EPDM rubber substrates, if the thermoplastic elastomeric block copolymer consists of non-elastomeric blocks derived from alphamethyl styrene, or alpha-methyl styrene with less than 10% of other vinyl monomers, such as styrene. The use of thermoplastic elastomeric block copolymers consisting of non-elastomeric alpha-methyl-styrene blocks and elastomeric butadiene blocks make it possible to obtain glues that excel all other known glues recommended for gluing EPDM rubber in initial adhesion, final adhesion, and resistance to high temperatures and ageing.

EPDM rubbers are well known in the art and are readily commercially available. As the EPDM rubber there can be employed many of the commercially available EPDM rubbers. The EPDM rubber normally contains 30 to 70 molar percent (preferably 50 to 60 molar percent) of ethylene, 65 to 20 molar percent (preferably 35 to 54 molar percent propylene) and 1 to 15 molar percent (preferably 3 to 5 molar percent) of the nonconjugated polyolefin. Usually the polyolefin is not over 10 molar percent. The ethylene and propylene can each be 5 to 95 molar percent of the composition.

As used in the present specification the term nonconjugated polyolefin includes aliphatic nonconjugated polyene hydrocarbons and cycloaliphatic nonconjugated polyene hydrocarbons, e.g., endocyclic dienes. Specific examples of suitable nonconjugated polyolefins include pentadiene-1,4; hexadiene-1,4; dicyclopentadiene, methyl cyclopentadiene dimer, cyclododecatriene, cyclo-octadiene 1,5; 5-methylene-2-norbornene.

Specific examples of suitable terpolymers are the Royalenes which contain 55 mole percent ethylene, 40 to 42 mole percent propylene and 3 to 5 mole percent dicyclopentadiene; Enjay terpolymers, e.g. ERP-404 of Enjay and Enjay 3509 which contains about 55 mole percent ethylene, 41 mole percent propylene and 4 mole percent 5-methylene-2-norbornene; Nordel, a terpolymer of 55 mole percent ethylene, 40 mole percent propylene and 5 mole percent hexadiene-1,4. Another suitable terpolymer is the one containing 50 mole percent ethylene, 47 mole percent propylene and 3 mole percent 1,5-cyclooctadiene (Dutrel).

Examples of EPDM rubbers are given in U.S. Pat. Nos. 2,933,480; 3,000,866; 3,063,973; 3,093,620; 3,093,621, and 3,136,739, in British Patent No. 880,904 and in Belgian Patent 623,698.

Terpolymers and other EPDM rubbers from ethylene, propylene and dicyclopentadiene are exemplifed in Tarney Patent No. 3,000,866; Adamek Patent No. 3,136,739 and Dunlop (British) Patent No. 880,904. EPDM rubbers from ethylene, propylene and 1,4-hexadiene are exemplified in Gresham Patent 2,933,480. As shown in Gresham, other suitable nonconjugated diolefins are 1,4-pentadiene; 2-methyl1,5-hexadiene, 3,3-dimethyl-1, 5-hexadiene, 1,7-octadiene, 1,9decadiene, 1,19-eicosadiene, 1,4-hexadiene, 1,9-octadecadiene, 6-methyl-1,5-heptadiene, 7-methyl - 1,6 - octadiene, 11-ethyl-1,11tridecadiene.

EPDM rubbers from ethylene, propylene and 5-methylene-2-norbornene are exemplifies in U.S. Pat. No. 3,093,621. Suitable norbornadiene, e.g., 2-methyl norbornadiene, 2-ethyl norbornadiene, 2-n-heptyl norbornadiene are shown in Gladding Patent 3,063,973 and bicyclo compounds such as bicyclo (2,2,2) heptadiene-2,5 are shown in Dunlop (British) Patent No. 880,904. The use of cyclooctadiene -1,5 and other cyclodienes is shown in Montecatini (Belgium) Patent No. 623,698. Thus these can be used in making the EPDM elastomer 1,4-cycloheptadiene, 1,4-cyclooctadiene, 1,6-cyclodecadiene, 1,5-cyclododecadiene, 1,7-cyclodecadiene, 1,5,9-cyclododecatriene, 1-methyl-1,5-cyclooctadiene.

These glues may be used for gluing articles made of EPDM rubber to each other, or for gluing EPDM rubber to substrates that are easier to glue, such as, e.g., metal, coats of lacquer, polyvinyl chloride, plasticized polyvinyl chloride. But when plasticized PVC with a high content of plasticizer is to be glued, it is advisable to protect the PVC from plasticizer migration by means of a protective layer of polymethyl methacrylate and/or chlorinated polyvinyl chloride prior to applying the adhesive of the invention to the PVC surface. Both EPDM rubbers with a low content of fillers and those with a high content of fillers can be glued successfully by means of the glue containing thermoplastic elastomeric block copolymers based on alpha-methyl styrene and butadiene.

An excellent glue for EPDM rubber can be obtained by preparing a solution containing a solvent or mixture of solvents that thoroughly wets the EPDM, a thermoplastic elastomeric block copolymer of the formula $AB(A)_n$, where n is a number of 1 to 3, A represents a non-elastomeric polymer block consisting substantially of alpha-methyl-styrene units, and B an elastomeric polymer block consisting of butadiene and/or isoprene units, and an elastomeric polymer containing two to three isocyanate groups per polymer molecule and having a molecular weight of between 1500 and 4000, the block copolymer and the polymer containing isocyanate groups together constituting 20 to 35% by weight of the solution, and the amount of polymer that contains isocyanate groups being 5–15% by weight based on the weight of the block copolymer.

The invention will be further elucidated with reference to some examples, but is not restricted to the embodiments contained therein and is to be construed as including all equivalents known to the art. A. The tests were carried out with glue compounds based on the following thermoplastic block copolymers.

| code | composition | linking agent | melt index 190° C; 10 kg | rigidity 300% in kg/cm$^2$ | tensile strength kg/cm$^2$ | elongation at rupture % |
|---|---|---|---|---|---|---|
| T-1*) | S-B-S | unknown | 0.25 | 21 | 212 | 1000 |
| T-2**) | S-I-S | unknown | about 24 | 8 | 136 | 1410 |
| T-3 | α-MS-B-α-MS | amyl acetate | 2.5 | 26 | 289 | 910 |
| T-4 | α-MS-B-α-MS | diamyldichlorosilane | 1.4 | 42 | 331 | 670 |
| T-5 | α-MS-B-α-MS | monoamyl trichlorosilane | 0.33 | 50 | 320 | 570 |
| T-6 | α-MS-B-α-MS | tin tetrachloride | about 5 | 28 | 246 | 710 |
| T-7 | α-MS-B-α-MS | toluene di-isocyanate | 4 | 20 | 240 | 1200 |

S = styrene
B = butadiene
I = isoprene
α–MS = α-methyl styrene
*) commercial product Cariflex TR 1101 (Shell)
**) commercial product Cariflex TR 1107 (Shell)

B. The tests were carried out with glue compounds containing one of the polymers containing isocyanate groups M-1 to M-6. The polymers M-1 up to and including M-5 were obtained by reaction of toluene di-isocyanate with the polymers containing hydroxyl groups that are mentioned in the table.

| Code | polymer containing OH groups | OH functional valency | OH content mgeg./g |
|---|---|---|---|
| M-1 | linear polycaprolactone diol, mol.wt. 2000 | 2 | 1.0 |

-continued

| Code | polymer containing OH groups | OH functional valency | OH content mgeg./g |
|---|---|---|---|
| | commercial product NIAX-PCP-0240 (Union Carbide) | | |
| M-2 | butadiene-acrylonitrile copolymer 85 / 15, commercial product ON-15 | 2.1–2.6 | 0.70 |
| M-3 | butadiene-styrene copolymer 75 / 25 commercial product CS-15 | 2.1–2.6 | 0.75 |
| M-4 | polybutadiene, commercial product R-15 M | 2.1–2.6 | 0.75 |
| M-5 | copolymer of butyl acrylate, styrene, methyl methacrylate, and β-hydroxy-ethyl acrylate | — | 1.12 |
| M-6 | isocyanate-terminal polyether isocyanate with an isocyanate content of about 4,1%, commercial product Adiprene L-100 (Du Pont) | | |

The polymers M-1 up to and including M-5 are prepared by dissolving the hydroxyl-terminal polymer and toluene diisocyanate in dry toluene to a content of 50%. At least so much toluene di-isocyanate is used that just all hydroxyl groups are converted into di-isocyanate radicals still containing a free isocyanate group, preferably 1 to 1.1 mole-equivalents per hydroxyl group. The conversion is complete after heating at 115° C for one hour with stirring and with exclusion of water by a nitrogen atmosphere.

C. Glue compounds were obtained by preparing first a 25% by weight solution of the thermoplastic block copolymer in dry toluene or another solvent and then adding an amount of solution of the polymer containing the isocyanate groups, so that the desired weight ratio between the block copolymer and the polymer containing isocyanate groups is obtained at ambient temperature.

D. The substrates used were specimens measuring 15 × 1 × 2.5 cm and made of black (filled with carbon black) or white (filled with chalk) EPT - commercial product KELTAN 512 of DSM - and profiled articles made of EPT spongy rubber and having a cross-sectional area of 2.5 cm². Use was furthermore made of 25 × 0.2 × 5 cm specimens of plasticized polyvinyl chloride (100 parts of PVC, commercial product Varlan 6600 of DSM, 60 parts of dioctyl phthalate and 40 parts of chalk), which had been coated with a mixture of polymethyl methacrylate and chlorinated PVC in order to avoid plasticizer migration. Use was also made of 25 × 5 cm steel specimens that had been coated with a commercially available car lacquer which was an acrylate lacquer.

EPT is a terpolymer of ethylene, propylene and a non-conjugated polyene.

E. The tests were carried out by degreasing the surfaces to be glued with trichloroethane or toluene and covering them with a thin layer of glue by smearing or immersion. The substrates were exposed to the air for some time, the "open time", (6 minutes, unless stated otherwise) and next put on top of each other and pressed with a 5-kg roller for a short time, after which the combination hardened at room temperature for 3 days.

The binding strength of the glued substrates was determined by means of an Instron draw bench at 20° C (unless stated otherwise). Butt-glued samples were stretched lengthwise, EPT-plasticized PVC through an angle of 180°, and glued EPT-laquered steel joints through an angle of 90°.

EXAMPLE I

Black spongy rubber was glued to plasticized PVC by means of a glue consisting of 30% solution in toluene of T-7 and M-2 in a T-7/M-2 weight ratio of 90/10.

The results are compiled in the table.

| hardened at 20° C for | peeling force in kg/2.5 cm | | | | | | deviating temperature during measurement |
|---|---|---|---|---|---|---|---|
| | open time during gluing, in minutes | | | | | | |
| | 1 | 3 | 5 | 6 | 7 | 10 | |
| 1 minute | 0.10 | 0.58 | 1.20 | 1.03 / 1.03 | 1.15 | 0.80 | — |
| 1 hour | — | — | — | 4.63 | — | — | — |
| 5 hours | — | — | — | 7.90* | — | — | — |
| 24 hours | — | — | — | 8.00* | — | — | — |
| 72 hours | 6.90* | 7.65* | 8.00* | 9.50* | 6.50* | 6.40* | — |
| 72 hours | | | | 5.15 | | | 50° C |
| 72 hours | | | | 2.15 | | | 70° C |
| 72 hours | | | | 1.10 | | | 90° C |

After hardening for 72 hours, the specimens were kept in air or in water for some days at 70° C. In all cases the open time during gluing was 6 minutes and the temperature during measurement was 20° C. The results are compiled in the table.

| number of days | peeling force in kg/2.5 cm | | | | | | | | | | |
|---|---|---|---|---|---|---|---|---|---|---|---|
| in air | 1 | 2 | 3 | 5 | 7 | 14 | | | | | |
| in water | | | | | | | 1 | 2 | 3 | 5 | 7 | 14 |
| | 6.40* | 5.90* | 5.75* | 4.65* | 4.65* | 5.25* | 4.95* | 5.15* | 4.25* | 4.80* | 4.85* | 5.55* |

Note: Where a peeling-force value is marked with an asterisk in this table and in the following tables, it means that rupture occurred only in the EPT substrate. Consequently, the adhesive strength of the layer of glue is higher than the value indicated.

Note: Where a peeling-force value is marked with an asterisk in this table and in the following tables, it means that rupture occurred only in the EPT substrate. Consequently, the adhesive strength of the layer of glue is higher than the value indicated.

EXAMPLE II

Black EPDM spongy rubber was glued to plasticized PVC by means of a glue consisting of a 30%-by-weight solution in toluene of block copolymer T-1 and polymer containing isocyanate groups M-2 in a T-1/M-2 ratio of 90 / 10. The results are compiled in the table.

| hardened at 20° C for | peeling force in kg/2.5 cm open time during gluing, in minutes | | | | | |
|---|---|---|---|---|---|---|
| | 1 | 3 | 5 | 6 | 7 | 10 |
| 1 hour | — | — | — | 1.20 | — | — |
| 5 hours | — | — | — | 2.38 | — | — |
| 24 hours | — | — | — | 3.75 | — | — |
| 72 hours | 5.20 | 4.60 | 4.0 | 3.90 | 4.15 | 4.50 |

The fully hardened samples that had been glued with an open time of 6 minutes showed a peeling force of 1.58 kg/2.5 cm at 50° C, of 0.38 kg/2.5 cm at 70° C, and of 0.06 kg/2.5 cm at 90° C.

The glue is suitable for gluing, e.g. PVC or ABS, but is less suitable for gluing EPDM rubber.

EXAMPLE III

While EPDM spongy rubber was glued to plasticized PVC by means of the glue solution used in Example I, but in this case a 70/30 mixture of toluene and cyclohexane was used as solvent. The results are compiled in the table.

| hardened at 20° C for | peeling force in kg/2.5 cm open time during gluing, in minutes | | | | | |
|---|---|---|---|---|---|---|
| | 1 | 3 | 5 | 6 | 7 | 10 |
| 1 minute | 0.60 | 0.70 | 0.63 | 1.28 | 1.05 | 0.90 |
| 72 hours | 7.55* | 8.00* | 7.50* | — | 6.85* | 6.70* |

EXAMPLE IV

Black EPDM spongy rubber was glued to lacquered steel plate by means of the glue used in Example III. After 3 days' hardening the peeling force was 10.85* kg/2.5 cm at 20° C, 5.25 kg/2.5 cm at 50° C, 3.10 kg/2.5 cm at 70° C. and 1.00 kg/2.5 cm at 90° C.

After ageing at 70° C in air for 7 days, the specimens still had a peeling force of 6.10* kg/cm², and after ageing at 70° C in water for 7 days a peeling of 5.90* kg/2.5 cm.

EXAMPLE V

Black EPDM spongy profiled articles were butt-glued by means of the glue used in Example I, the area of contact being 2.2 cm². The results are compiled in the table.

| hardened at 20° C | tensile force until rupture, in kg/2.2 cm² open time during gluing, in minutes | | | | | |
|---|---|---|---|---|---|---|
| | 1 | 3 | 5 | 6 | 7 | 10 |
| 1 minute | 0.80 | 2.50 | 4.70 | 5.20 | 6.20 | 4.00 |
| 1 hour | 18.80 | 19.00 | 13.20 | 14.20 | 9.20 | — |
| 24 hours | 23.40 | 29.50 | 29.00 | 25.40 | 15.00 | — |
| 72 hours | 25.50* | 32.50 | 27.00 | 28.90 | 31.00 | — |

Consequently, the EPDM glue according to the invention is suitable for butt-gluing profiled articles, which so far required the use of cyanacrylate glues which are expensive and difficult to process.

EXAMPLE VI

Example V was repeated with glue solution having concentrations of 25 and 30% by weight.

After an open time of 6 minutes and 3 × 24 hours' hardening at 20° C, the tensile force was measured at various temperatures. The results of the measurements are mentioned in the table.

| temperature of measurement | tensile force until rupture, in kg/2.2 cm² | |
|---|---|---|
| | 25% solution | 30% solution |
| 20° C | 39.3 | 34.8 |
| 50° C | 33.2 | 19.4 |
| 70° C | 24.8 | 16.9 |
| 90° C | 18.7 | 15.0 |

After the glued joint made with the 30% glue had aged in air or in water of 70° C, the following values were measured (at 20° C).

| temperature of measurement | tensile force until rupture, in kg/2.2 cm² | |
|---|---|---|
| | 25% solution | 30% solution |
| 20° C | 39.3 | 34.8 |
| 50° C | 33.2 | 19.4 |
| 70° C | 24.8 | 16.9 |
| 90° C | 18.7 | 15.0 |

| aging time | tensile force until rupture, in kg/2.2 cm² | |
|---|---|---|
| | air | water |
| 24 hours | 42.5 | 41.0* |
| 2 × 24 hours | 43.2 | 44.4* |
| 3 × 24 hours | 48.9* | 45.6* |
| 5 × 24 hours | > 50* [1] | 45.5* |
| 7 × 24 hours | > 50* [1] | > 50* [1] |
| 14 × 24 hours | 39.8* | 43.7* |

[1] upper limit of bench

EXAMPLE VII

Black EPDM spongy rubber was glued to plasticized PVC with the use of toluene solutions of block copolymer T-7 and polymer containing isocyanate groups M-3 with various T-7/M-3 ratios.

The peeling was carried out at 20° C (after 3 days' hardening at 20° C, followed by aging in water of 70° C).

The results are compiled in the following table.

| T-7/M-3 ratio | appreciation of the adhesion |
|---|---|
| 95/5 | rupture in EPDM substrate only |
| 90/10 | rupture in EPDM substrate only |
| 80/20 | partly rupture in EPDM substrate, partly separation between layer of glue and surface of substrate |
| 60/40 | rupture in layer of glue and separation between layer of glue and surface of substrate |
| 40/60 | rupture in layer of glue at relatively low peeling force |
| 0/100 | rupture in layer of glue at low forces |

EXAMPLE VIII

Black EPDM spongy rubber was glued to PVC with the use of glues of various compositions and also, for the sake of comparison, with solutions of a thermoplastic block copolymer only. The glues contained 25-30% by weight of active components, the solvent being toluene. The adhesion was determined qualitatively by means of tensile tests after 3 days' hardening at 20° C (H), and after 3 days' hardening plus 3 days' aging in air (A) or water (W) at 70° C.

The results are compiled in the following table.

| A thermoplastic block copolymer | B polymer with isocyanate groups | A/B ratio | rating of the adhesion H | A | W |
|---|---|---|---|---|---|
| T-1 | M-3 | 90/10 | m | s | s |
| T-1 | M-2 | 90/10 | m | s | s |
| T-1 | — | — | s | s | s |
| T-2 | M-3 | 90/10 | m | s | s |
| T-2 | M-2 | 90/10 | m | s | s |
| T-2 | — | — | s | s | s |
| T-3 | M-3 | 90/10 | g | g | g |
| T-3 | M-2 | 90/10 | g | g | g |
| T-3 | — | — | g | m | s |
| T-4 | M-3 | 90/10 | g | g | g |
| T-4 | M-2 | 90/10 | g | g | g |
| T-4 | — | — | g | m | s |
| T-5 | M-3 | 90/10 | g | g | g |
| T-5 | M-2 | 90/10 | g | g | g |
| T-5 | — | — | g | m | s |
| T-6 | M-3 | 90/10 | g | g | g |
| T-6 | M-2 | 90/10 | g | g | g |
| T-6 | — | — | g | m | s |
| T-7 | M-3 | 90/10 | g | g | g |
| T-7 | M-2 | 90/10 | g | g | g |
| T-7 | — | — | g | m | s |
| T-7 | M-1 | 90/10 | g | g | g |
| T-7 | M-4 | 90/10 | g | g | g |
| T-7 | M-5 | 90/10 | g | g | g |
| T-7 | M-6 | 90/10 | g | g | g |

Legend to the table:
g = good adhesive strength; rupture in EPDM substrate only
m = moderate adhesive strength; partly rupture in substrate, partly separation between layer of glue and substrate
s = poor adhesive strength; only separation between layer of glue and substrate.

EXAMPLE IX

For the sake of comparison black EPDM spongy rubber was glued to plasticized PVC with the use commercially available rubber glues under conditions stated as best by the manufacturer. The peeling strength was determined after 3 days' hardening at 20° C. The results are compiled in the table.

| peeling force kg/2.5 cm | type of glue | trade name and manufacturer |
|---|---|---|
| 1.7 | neoprene glue | Novaflex 58 Titan, made by CIC |
| 1.5 | neoprene glue | Freneken 1000, made by Freneken |
| 1.8 | polyurethane glue | Sabaplast T-70, made by Saba |
| 0.7 | polyuethane 40% in toluene | Estane 5710, made by Goodrich |
| 3.0 | 100 parts of carboxyl-terminal butadiene acrylonitrile rubber Hycar MTBN made by Ciago + 80 parts of polyamide (Versamid 140) and 80 parts of polyepoxide (EPIKOTE 828) | |

In all cases there is separation between the rubber and the layer of glue. The recipe last mentioned is recommended by the Ciago company.

EXAMPLE X

EPDM spongy rubber was glued to different substrates by means of a 20% by weight solution of T-7 block copolymer and M-2 polymer containing isocyanate groups (T-7/M-2 ratio = 90/10) in a mixture of toluene and hexane (10/90). The open time was

| substrate | peeling force in kg/2.5 cm |
|---|---|
| nylon-6 | 12.2 |
| polycarbonate | 6.5 |
| ABS | 10.0 |
| polybutylene terephthalate | 10.0 |
| EPDM film with a high content of fillers (200 parts of carbon black and 100 parts of oil) | 5.0 |

EXAMPLE XI

EPDM spongy rubber was glued to lacquered steel plate by means of the glue described in Example X (open time 6 minutes, hardening 72 hours at 20° C). The peeling strength was 10.8 kg/2.5 cm. When use was made of 20% solution of T-7 in toluene-cyclohexane (10/90), a peeling strength of 5.0 kg/2.5 cm was found.

What is claimed is:
1. An adhesive composition, based on a thermoplastic elastomeric block-copolymer, comprising
   1. an inert organic vehicle which is an aromatic hydrocarbon, a chlorinated lower hydrocarbon containing 1 to 4 carbon atoms or tetrahydrofuran, having a boiling point below 150° C, said inert organic vehicle being a solvent which is unreactive with (2) and (3) and is a solvent for the components (2) and (3) below wherein
   2. a thermoplastic elastomeric block-copolymer of the formula $AB(A)_n$
      wherein A is a terminal non-elastomeric block, and is an aryl-substituted vinyl compound, wherein said aryl may be substituted or unsubstituted, and if substituted, the substituents may be lower alkyl of 1 to 4 carbon atoms, or halogen and wherein said vinyl group contains at least 2 carbon atoms, said vinyl group being substituted or unsubstituted in the alpha or beta position by substituents including lower alkyl of 1 to 4 carbon atoms or by halogen atoms;
      B is an elastomeric polymer block, formed of a monomeric conjugated diene of 4 to 12 carbon atoms;
      n is the number between 1 to 10; and
   3. a polymer containing 2 to 5 free isocyanate groups per molecule and having a molecular chain with a molecular weight of 500 to 10,000, and being the reaction product of a diisocyanate and telechelic rubber homopolymers containing hydroxyl groups and based on a conjugated aliphatic diene, and telechelic rubbery copolymers containing hydroxyl groups and based on at least one conjugated aliphatic diene in combination with at least one copolymerizable olefinically unsaturated comonomer, in which reaction product, substantially all hydroxyl groups are replaced by a radical containing at least one free isocyanate group which is the reaction product of said hydroxyl groups with said di-isocyanate radicals, said inert vehicle being a solvent for components (2) and (3),
   wherein the combination of the block-copolymer (2) and (3) polymer containing isocyanate groups are present in the dissolved state in an amount of between 5 and 60% by weight of the composition.
2. The composition of claim 1, wherein the block-copolymer combination of (2) and (3) comprises 15 to 35% by weight of the composition.
3. The composition of claim 1, wherein the polymer containing isocyanate groups is present in an amount of

5 to 40% by weight based on said thermoplastic elastomer block-copolymer (2).

4. The composition of claim 2, wherein said polymer containing isocyanate groups present in an amount of 5 to 15% by weight based on said thermoplastic elastomeric block-copolymer.

5. The composition of claim 1, wherein the polymer chain of the polymer containing isocyanate groups has a molecular weight of between 1000 and 7000.

6. The composition of claim 1, wherein the polymer chain of the polymer containing isocyanate groups has a molecular weight of between 1500 and 4000.

7. The composition of claim 1, wherein A or $AB(A)_n$ is styrene or alpha-methyl styrene and wherein B is butadiene or isoprene.

8. The composition of claim 1, wherein $n$ is a number 1 to 3, A a non-elastomer polymer block consisting of alpha-methylstyrene units and having a molecular weight of between 7500 and 17,000, B is a branched or unbranched elastomeric polymer block consisting of butadiene units and having a molecular weight of between 30,000 and 75,000.

9. The process of forming the adhesive of claim 1, comprising (a) providing
1. said inert organic vehicle which is an aromatic hydrocarbon, a chlorinated lower hydrocarbon containing 1 to 4 carbon atoms or tetrahydrofuran, having a boiling point below 150° C;
2. said thermoplastic elastomeric block-copolymer of the formula $AB(A)_n$
   wherein A is a terminal non-elastomeric block, and is an aryl-substituted vinyl compound, wherein said aryl may be substituted or unsubstituted, and if substituted, the substituents may be lower alkyl of 1 to 4 carbon atoms, or halogen and wherein said vinyl group contains at least 2 carbon atoms, said vinyl groups being substituted or unsubstituted in the alpha or beta position by substituents including lower alkyl of 1 to 4 carbon atoms or by halogen atoms;
   B is an elastomeric polymer block, formed of a monomeric conjugated diene of 4 to 12 carbon atoms;
   $n$ is the number between 1 and 10; and
3. said polymer containing 2 to 5 free isocyanate groups per molecule and having a molecular chain with a molecular weight of 500 to 10,000, and said polymer being said reaction product, said inert vehicle being a solvent for components (2) and (3),
   wherein the combination of the block-copolymer (2) and (3) polymer containing isocyanate groups are present in the dissolved state in an amount of between 5 and 60% by weight of the composition, in amounts such that components (2) and (3) combined comprise 5 to 60% by weight of the total composition of (1), (2) and (3); and (b) mixing said components.

10. The process of claim 9, wherein A is a polymer block formed from styrene, alpha-styrene or chlorostyrene.

11. The process of claim 9, wherein said polymer containing terminal hydroxy groups and said di-isocyanate are dissolved in said inert organic vehicle and allowed to react to form component (3); and then mixing the reaction mixture so produced with a solution of component (2) in said inert organic vehicle.

12. The composition of claim 1, wherein the polymer (3) contains 2 to 3 isocyanate groups per molecule.

* * * * *